(12) United States Patent
Tanaka (10) Patent No.: US 10,885,685 B2
(45) Date of Patent: Jan. 5, 2021

(54) ELECTRONIC APPARATUS FOR DRAWING GRAPHS OF MATHEMATICAL EXPRESSIONS

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/383,320

(22) Filed: Apr. 12, 2019

(65) Prior Publication Data

US 2019/0318517 A1 Oct. 17, 2019

(30) Foreign Application Priority Data

Apr. 17, 2018 (JP) .................. 2018-079454

(51) Int. Cl.
*G06T 11/20* (2006.01)
*G06F 16/901* (2019.01)
*H04L 29/06* (2006.01)
*G06F 17/11* (2006.01)
(Continued)

(52) U.S. Cl.
CPC .......... *G06T 11/206* (2013.01); *G06F 3/0488* (2013.01); *G06F 16/9024* (2019.01); *G06F 16/9035* (2019.01); *G06F 17/11* (2013.01); *H04L 67/42* (2013.01)

(58) Field of Classification Search
CPC .............. G06T 11/206; G06F 16/9035; G06F 16/9024; G06F 3/0488; G06F 17/11; H04L 67/42
See application file for complete search history.

(56) References Cited

U.S. PATENT DOCUMENTS

2010/0194759 A1* 8/2010 Hatch ................. G06F 15/0225
345/467
2015/0170372 A1* 6/2015 Rubins ..................... G06K 9/52
345/440
(Continued)

OTHER PUBLICATIONS

Desomos, desmos User Guide, translated by Horikawa, Y., Retrieved on Apr. 16, 2018 (https://desmos.s3.amazonaws.com/Desmos_User_Guide_JA.pdf).

*Primary Examiner* — Jennifer N To
*Assistant Examiner* — Amy P Hoang
(74) *Attorney, Agent, or Firm* — Holtz, Holtz & Volek PC (57) ABSTRACT

An electronic apparatus includes a memory, a display, and a processor. If a display style when a point is specified in an image is a first display style, the processor obtains coordinates of the point in the first display style based on first drawing data stored in the memory without requesting a server to calculate the coordinates, and displays the coordinates on the display. If the display style is a second display style, the processor sends, to the server, relevant data including the coordinates of the point and information indicating that the display style is the second display style; receives second-display-style coordinate data which is (a) second drawing data including the coordinates in the second display style generated by the server based on the relevant data or (b) data including an address of the second drawing data; and displays, on the display, the coordinates based on the second-display-style coordinate data.

15 Claims, 6 Drawing Sheets

(51) Int. Cl.
*G06F 3/0488* (2013.01)
*G06F 16/9035* (2019.01)

(56) References Cited

U.S. PATENT DOCUMENTS

2018/0217816 A1* 8/2018 Clower .................. G06F 16/95
2019/0258746 A1* 8/2019 Zizka ................. G06F 16/9038

* cited by examiner

ELECTRONIC APPARATUS FOR DRAWING GRAPHS OF MATHEMATICAL EXPRESSIONS

CROSS-REFERENCE TO RELATED APPLICATIONS

This application is based upon and claims the benefit of priority from the prior Japanese Patent Application No. 2018-079454, filed on Apr. 17, 2018, the entire contents of which are incorporated herein by reference.

BACKGROUND OF THE INVENTION

1. Field of the Invention

The present invention relates to an electronic apparatus, an information processing method, a system, and a medium.

2. Description of the Related Art

There are known graph drawing applications usable on web browsers. For example, there is disclosed in a non-patent literature (Desmos, desmos User Guide, translated by HORIKAWA, Y., retrieved Apr. 16, 2018, from https://desmos.s3.amazonaws.com/Desmos_User_Guide_JA.pdf) an application which runs on a web browser(s) for executing arithmetic operations on the basis of mathematical expressions input by a user(s) into an expression list, and drawing graphs on the web browser on the basis of results of the arithmetic operations.

SUMMARY OF THE INVENTION

Advantages of the present invention include providing such a technology having an excellent interface.

According to an aspect of the present invention, there is provided an electronic apparatus including:
a memory;
a display; and
a processor which:
  sends first relevant data including a mathematical expression to at least one server;
  receives, from the at least one server, first drawing data generated by the at least one server based on the first relevant data;
  stores at least a part of the received first drawing data in the memory, and displays, on the display, an image of a figure based on the first drawing data;
  if a display style when a point is specified in the image after the image is displayed is a first display style, obtains coordinates of the point in the first display style based on the at least a part of the first drawing data stored in the memory without requesting the at least one server to calculate the coordinates of the point in the first display style, and displays the obtained coordinates in the first display style on the display; and
  if the display style when the point is specified in the image after the image is displayed is a second display style, or the display style is changed from the first display style to the second display style, (i) sends, to the at least one server, second relevant data including the coordinates of the point and information indicating that the display style is the second display style, (ii) receives second-display-style coordinate data which is (a) second drawing data including the coordinates of the point in the second display style generated by the at least one server based on the second relevant data or (b) data including an address of the second drawing data, and (iii) displays, on the display, the coordinates of the point in the second display style based on the second-display-style coordinate data.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention, wherein.

DETAILED DESCRIPTION OF THE PREFERRED EMBODIMENTS

Hereinafter, one or more embodiments of the present invention will be described with reference to the drawings. The embodiments relate to applications which utilize the Web, and are used, for example, in school education. The applications of the embodiments are especially used in mathematics education.

[Configuration of System]

Figure 1:
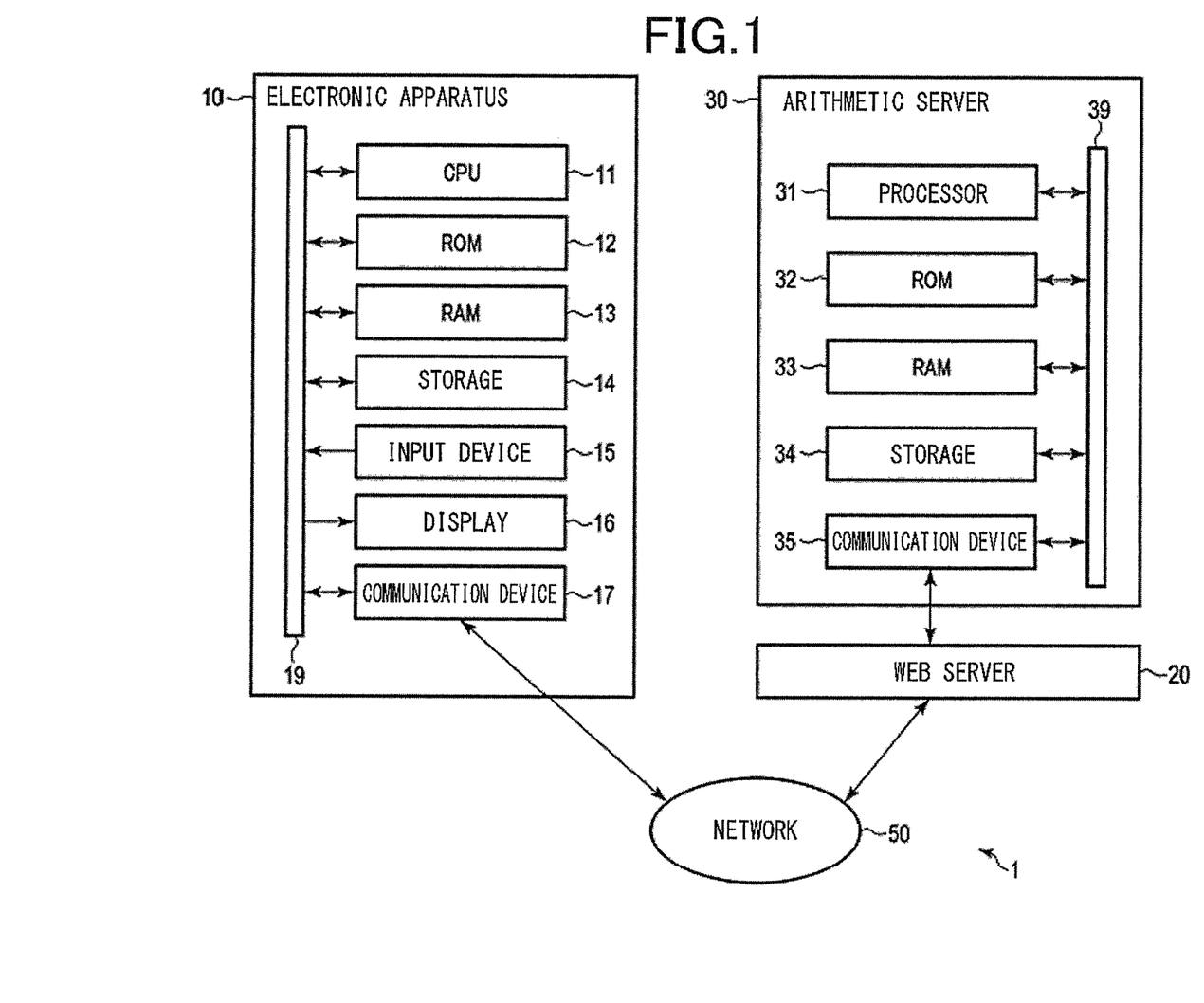
FIG. 1 is a block diagram schematically showing an example of configuration of a system according to an embodiment(s)

FIG. 1 is a diagram schematically showing an example of configuration of a system 1 according to an embodiment(s). The system 1 includes an electronic apparatus 10 as a client, a web server 20, and an arithmetic server 30. The electronic apparatus 10 is any type of electronic apparatus, which includes a personal computer (PC), a tablet information terminal, and a smartphone. On each of such electronic apparatuses, a web browser runs. Using the web browser, each electronic apparatus accesses the web server 20 connected to the arithmetic server 30 via a network 50, such as the Internet, and executes web applications. Hence, in the embodiment, the electronic apparatus 10 performs display in accordance with program data of a web application(s) stored in the web server 20.

FIG. 1 shows one electronic apparatus 10, but any number of electronic apparatuses may be included in the system 1. Any number of electronic apparatuses may execute web applications.

As shown in FIG. 1, the electronic apparatus 10 includes a central processing unit (CPU) 11, a read only memory (ROM) 12, a random access memory (RAM) 13, a storage 14 (memory), an input device 15, a display 16, and a communication device 17 which connect with one another via a bus line 19. The CPU 11 performs various types of signal processing and so forth. Instead of or in addition to the CPU 11, any type of integrated circuit, such as an application-specific integrated circuit (ASIC), a field-programmable gate array (FPGA), or a graphics processing unit (GPU), may be used. That is, the electronic apparatus 10 may use any type of processor. The ROM 12 stores a startup program and so forth. The RAM 13 functions as a main storage device for the CPU 11. As the RAM 13, for example, a dynamic RAM (DRAM) or a static RAM (SRAM) is used. As the storage 14, for example, a hard disk drive (HDD), a solid-state drive (SSD), or an embedded MultiMediaCard (eMMC) is used. The storage 14 stores programs and various types of information, such as parameters, used by the CPU 11. The RAM 13 and the storage 14 are not limited to the above respective examples, and each may be replaced by any type of storage device. The input device 15 is, for example, a keyboard, a mouse, and/or a touchscreen. The display 16 is, for example, a liquid crystal display or an organic EL display. The communication device 17 is used to communicate with apparatuses external to the electronic apparatus 10. The communication device 17 connects to the network 50, such as the Internet.

On the web server 20, a backend server for web applications exists. The web server 20 is in charge of processes which are necessary to execute web applications. The web server 20 sends, to the electronic apparatus 10, image data processed by a processer in the web server 20 in accordance with the program data of the web application(s) stored in a memory in the web server 20. The electronic apparatus 10 performs, with/on the display 16, display in accordance with the image data. Behind the web server 20, the arithmetic server 30 which executes arithmetic operations of various functions exists. An arithmetic engine of the arithmetic server 30 is accessible by the backend server of the web server 20 only, and cannot be accessed directly from the outside, so that the arithmetic engine is concealed.

As shown in FIG. 1, the arithmetic server 30 is an information processing apparatus, and includes a processor 31, a ROM 32, a RAM 33, a storage 34, and a communication device 35 which connect with one another via a bus line 39. The processor 31 performs various types of signal processing and so forth. The ROM 32 stores information used in operation of the processor 31. The RAM 33 functions as a main storage device for the processor 31. As the storage 34, any type of storage medium may be used. The storage 34 stores programs and various types of information, such as parameters, used by the processor 31.

Figure 5A:
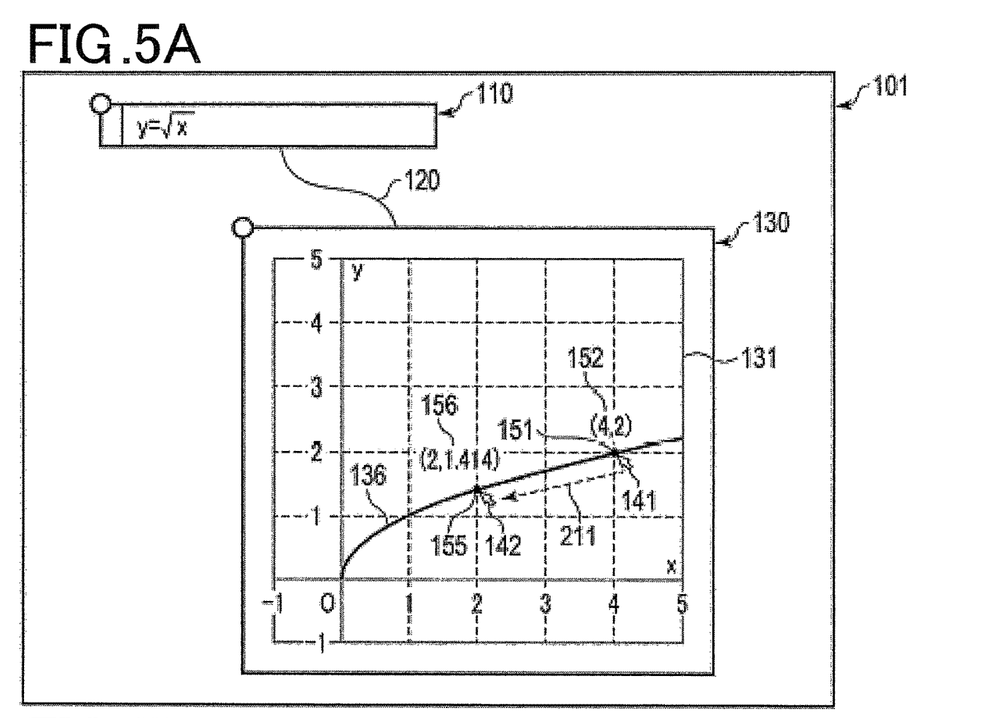
FIG. 5A shows an example of a screen relevant to a graph tag and displayed on the electronic apparatus.

In the embodiment, input and display are performed by using combination of small display regions having frames. The display regions are referred to as "tags" (e.g., sticky notes). There are multiple types of tags. FIG. 5A shows a screen example displayed on the display 16 of the electronic apparatus 10, and shows a mathematical expression tag 110, a graph tag 130, and so forth. The mathematical expression tag 110 is a tag where a mathematical expression(s), such as a function(s), is input. The graph tag 130 is a tag where a graph(s) is drawn. In the graph tag 130, for example, a graph representing a mathematical expression input in the mathematical expression tag 110 is displayed. The mathematical expression tag 110 and the graph tag 130 are mutually related. Such tags are visually connected with one another by a line which is referred to as "string 120". Shape and length of the string 120 are determined by relative positions of the mutually-related tags displayed on the display screen of the display 16.

[Operation of System]

The system 1 of the embodiment has many functions (in terms of functionality). Hereinafter, some of these will be described. Each function is realized by the electronic apparatus 10, the web server 20, and the arithmetic server 30 working in cooperation with one another. For example, when the electronic apparatus 10 where a web browser is running accesses the web server 20, the electronic apparatus 10 obtains programs from the web server 20. The CPU 11 of the electronic apparatus 10 executes the programs on the web browser. The CPU 11 of the electronic apparatus 10 executes various types of arithmetic operations and various types of display on the basis of information input onto the web browser by a user operating the input device 15 of the electronic apparatus 10. When arithmetic operations need to be executed by the arithmetic server 30, the CPU 11 of the electronic apparatus 10 sends information necessary for the arithmetic operations to the arithmetic server 30 via the web server 20. The arithmetic server 30 executes various types of arithmetic operations on the basis of information obtained from the electronic apparatus 10, and sends results of the arithmetic operations to the electronic apparatus 10 via the web server 20. The CPU 11 of the electronic apparatus 10 displays various images on the display 16 on the basis of information obtained from the arithmetic server 30.

Figure 3:
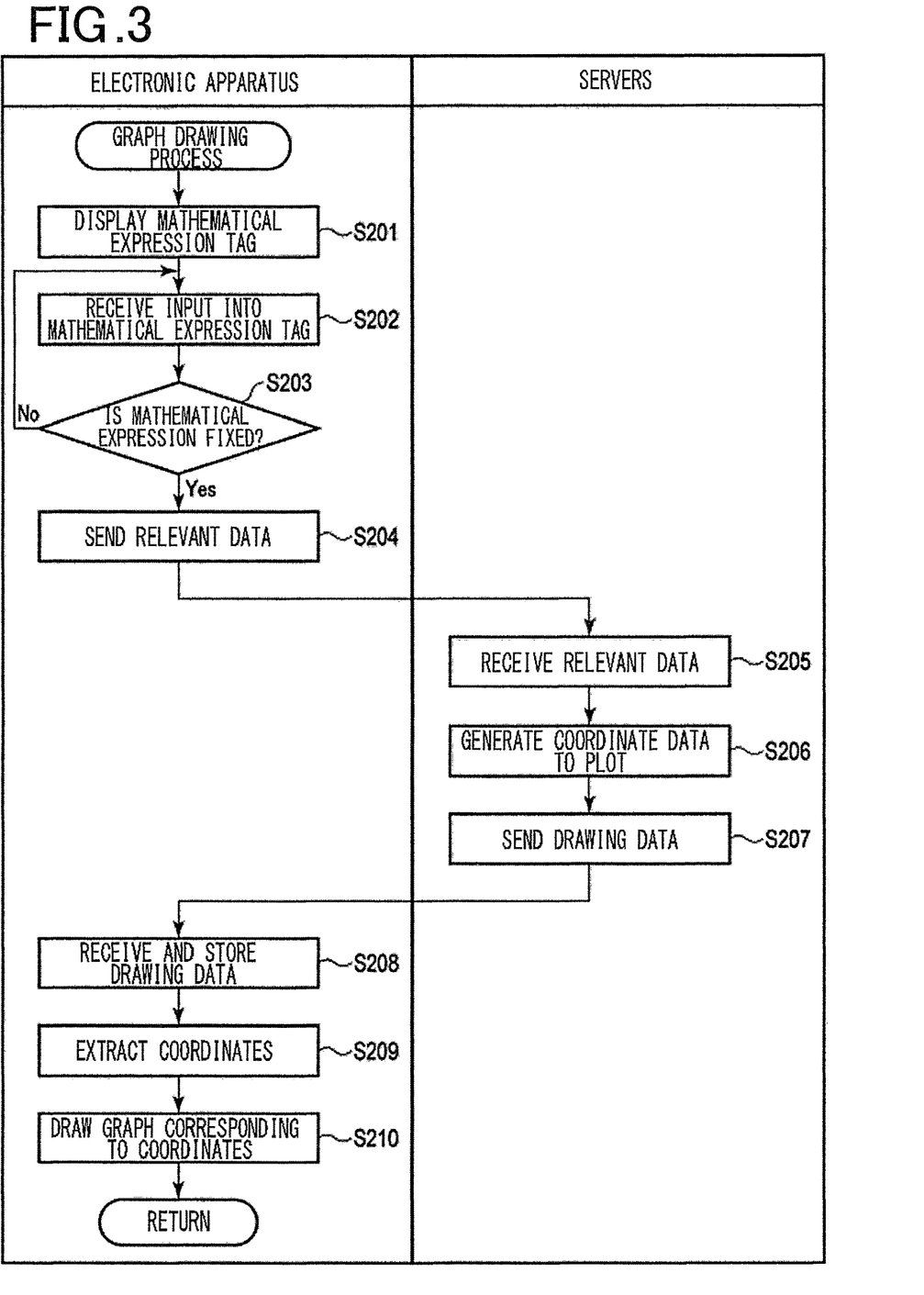
FIG. 3 is a flowchart showing outline of an example of a graph drawing process according to an embodiment(s)
Figure 4A:
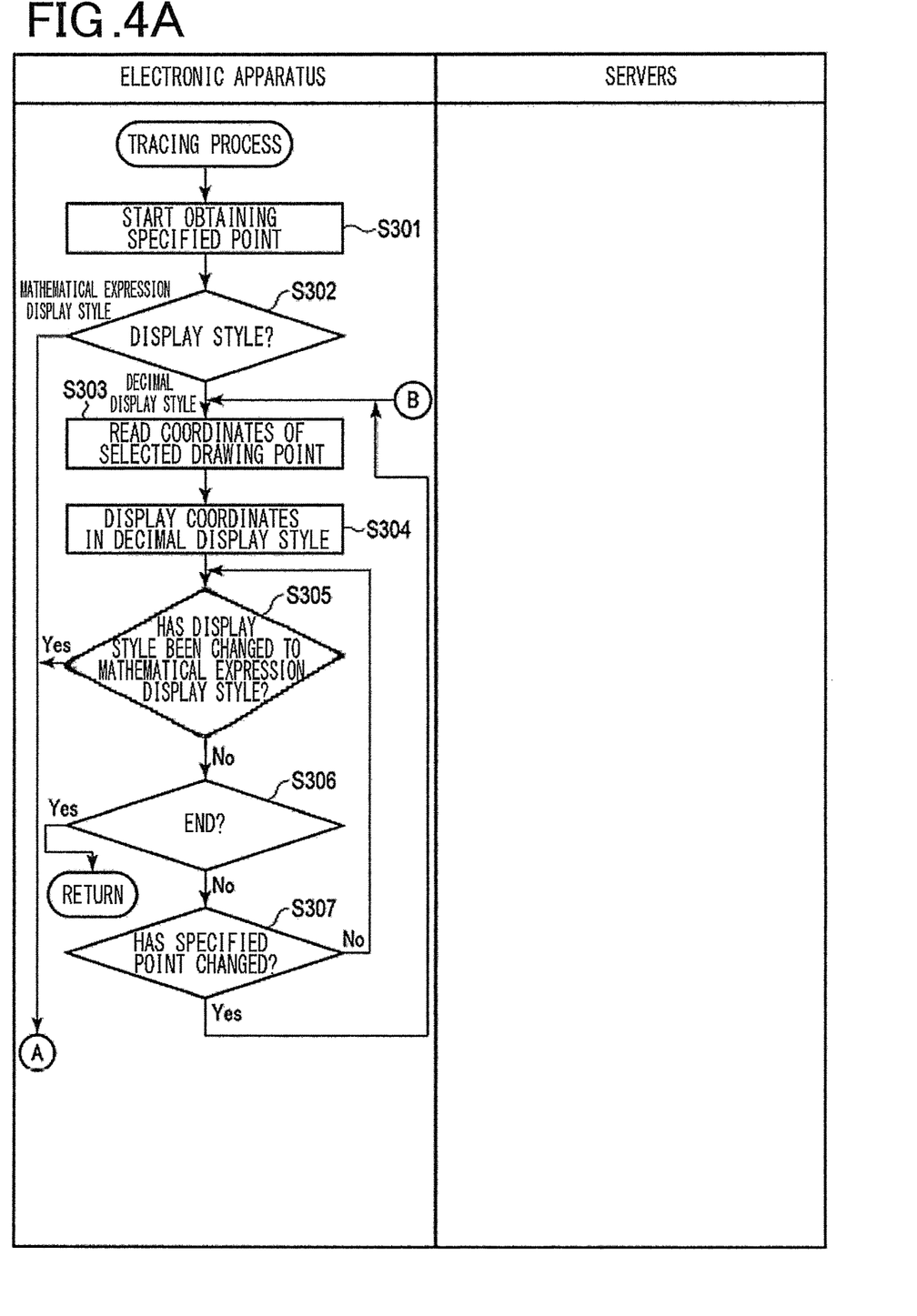
FIG. 4A is a flowchart showing outline of an example of a part of a tracing process according to an embodiment(s)
Figure 4B:
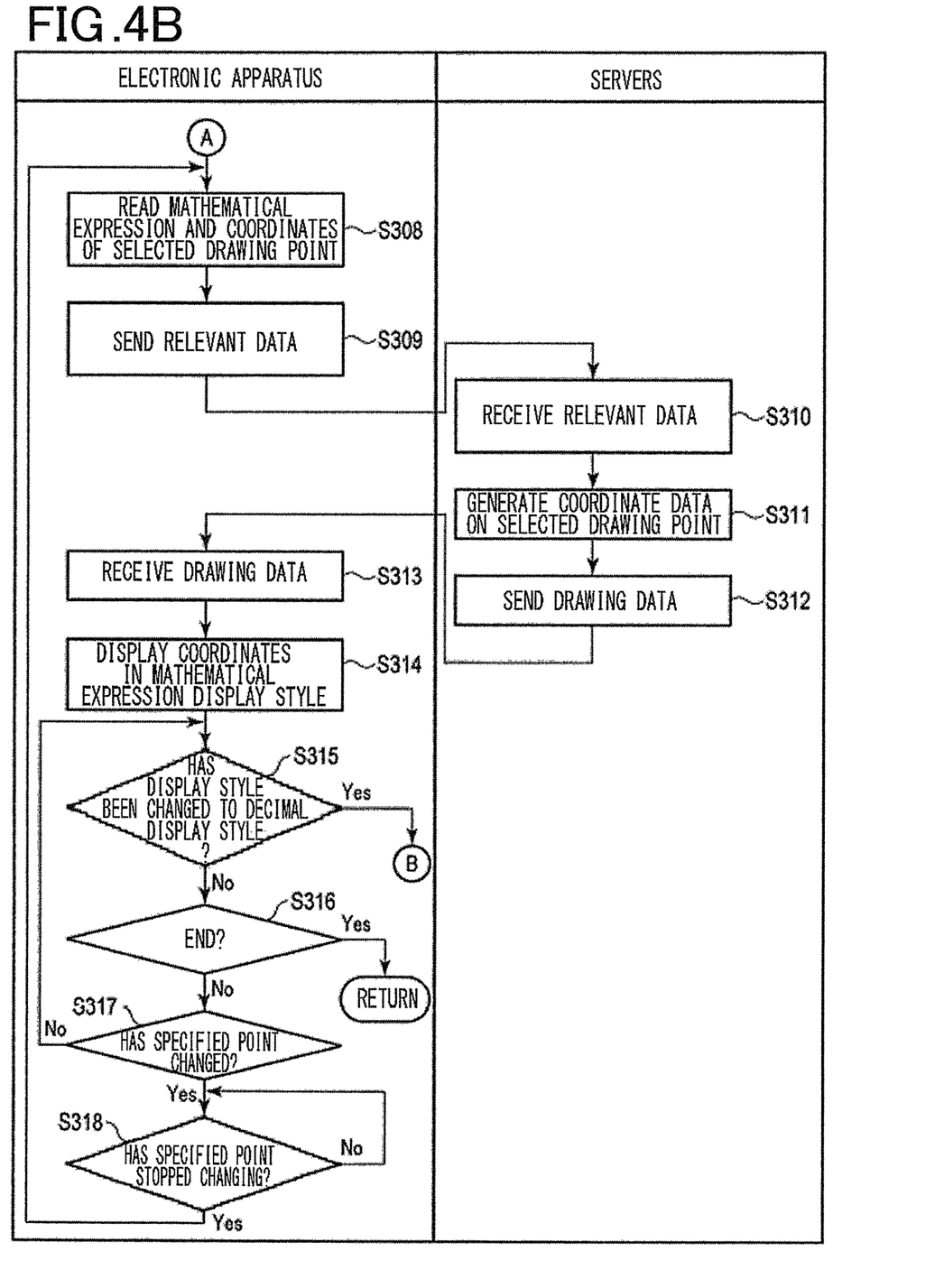
FIG. 4B is a flowchart showing outline of an example of the remaining part of the tracing process according to an embodiment(s)
Figure 5B:
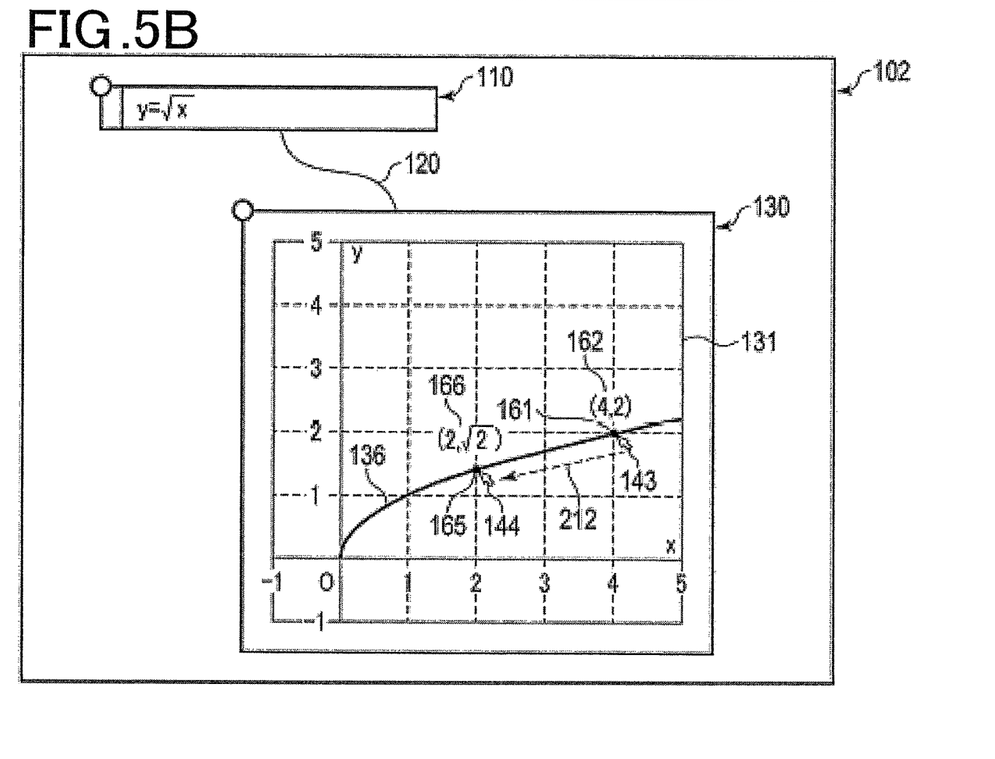
FIG. 5B shows an example of a screen relevant to the graph tag and displayed on the electronic apparatus.

Operation of the electronic apparatus 10 according to the embodiment will be described with reference to FIG. 2 to FIG. 4B, and, as needed, with reference to FIG. 5A and FIG. 5B. FIG. 2 to FIG. 4B show flowcharts. FIG. 5A and FIG. 5B show screen examples relevant to the graph tag 130.

Figure 2:
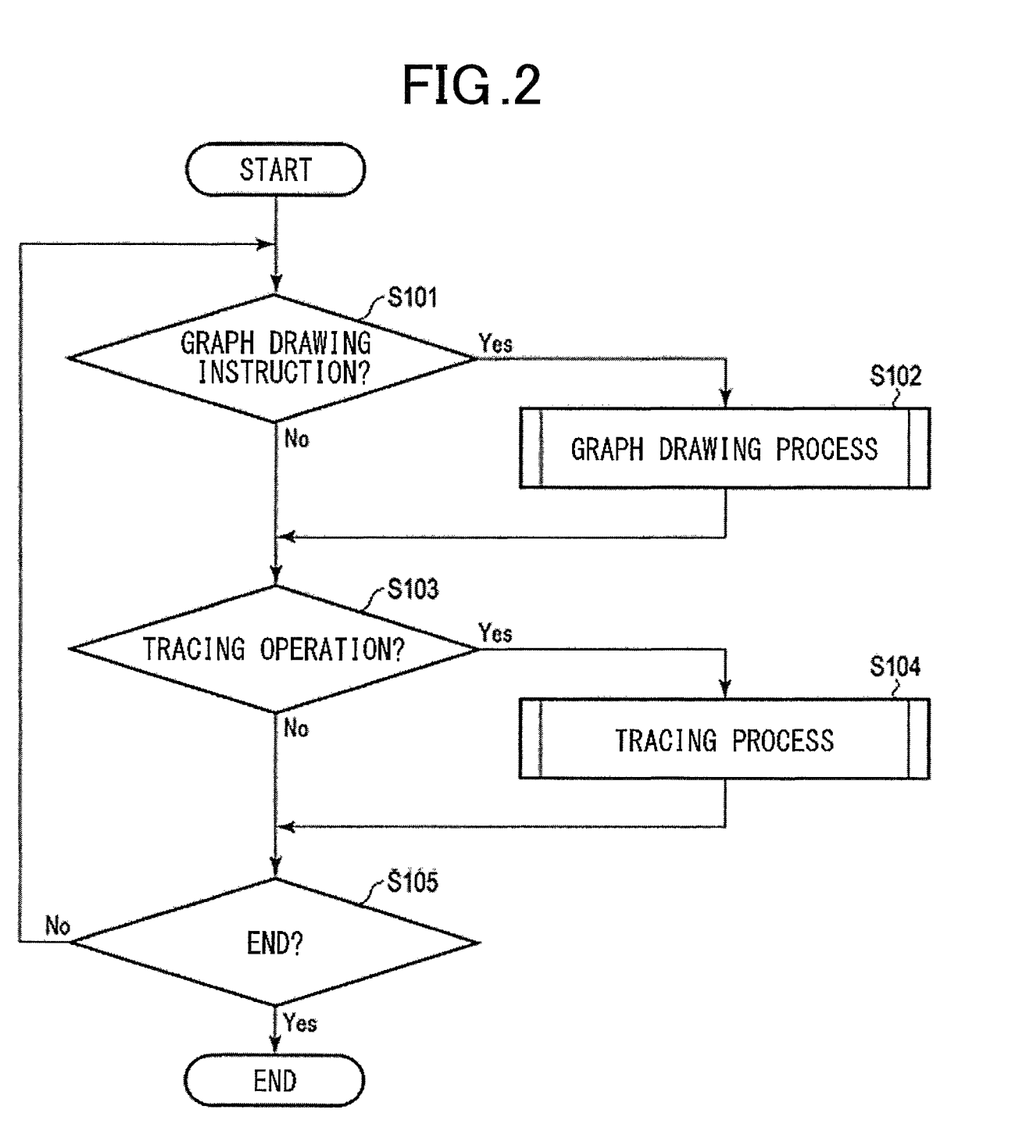
FIG. 2 is a flowchart showing outline of an example of a part of operation of an electronic apparatus according to an embodiment(s)

FIG. 2 is a flowchart showing outline of an example of a part of operation, a figure-related process, of the electronic apparatus 10.

In Step S101, the CPU 11 of the electronic apparatus 10 determines whether or not an instruction on graph drawing (graph drawing instruction) has been input. When the CPU 11 of the electronic apparatus 10 determines that no graph drawing instruction has been input, the figure-related process proceeds to Step S103. On the other hand, when the CPU 11 of the electronic apparatus 10 determines that a graph drawing instruction has been input, the figure-related process proceeds to Step S102.

In Step S102, the CPU 11 of the electronic apparatus 10 performs a graph drawing process. Hereinafter, the graph drawing process will be described with reference to FIG. 3. FIG. 3 shows its flowchart.

The CPU 11 of the electronic apparatus 10 creates the graph tag 130 in a screen (window) 101 of the display 16 in response to a user operation. Then, as shown in FIG. 3 and FIG. 5A, in Step S201, the CPU 11 of the electronic apparatus 10 displays, in the screen 101 of the display 16, the mathematical expression tag 110 which is empty, in response to a user operation. The empty mathematical expression tag 110 (not shown) means the mathematical expression tag 110 where no letter, numeral, mathematical expression or the like is displayed, but a cursor may be displayed therein depending on its status.

In the screen 101, the string 120 indicating that the mathematical expression tag 110 and the graph tag 120 are associated with one another is also displayed.

In Step S202, the CPU 11 of the electronic apparatus 10 receives an input(s) into the mathematical expression tag 110 made by the user using the input device 15. The user may use the hardware keyboard of the input device 15 to input a mathematical expression(s) into the mathematical expression tag 110, or may use a software keyboard displayed on the display 16 to input a mathematical expression(s) into the mathematical expression tag 110. The CPU 11 of the electronic apparatus 10 updates the displayed contents of the mathematical expression tag 110 according to the input.

After inputting a desired mathematical expression, the user makes an input to fix the mathematical expression.

In Step S203, the CPU 11 of the electronic apparatus 10 determines whether or not the mathematical expression input in the mathematical expression tag 110 is fixed. Until the mathematical expression is fixed, the graph drawing process repeatedly returns to Step S202 so that the CPU 11 of the electronic apparatus 10 receives an input(s) into the mathematical expression tag 110. When the CPU 11 of the electronic apparatus 10 determines that the mathematical expression is fixed, the graph drawing process proceeds to Step S204.

In Step S204, the CPU 11 of the electronic apparatus 10 generates relevant data which includes the fixed mathematical expression, a coordinate area where a graph is drawn, and various settings including a display style, and sends the relevant data to the arithmetic server 30 via the web server 20. In the case shown in FIG. 5A, the CPU 11 of the electronic apparatus 10 sends, as a request, data including a function "$y=\sqrt{x}$", a coordinate area of $-1 \leq x \leq 5$ and $-1 \leq y \leq 5$, and other settings including an interval(s) between drawing points to the arithmetic server 30. The relevant data may include identification (ID) data identifying to which figure the relevant data is relevant, and below-described drawing data may include ID data which agrees with the ID data of the relevant data.

In Step S205, the web server 20 receives the relevant data, which includes the mathematical expression, the coordinate area, and various settings, sent from the electronic apparatus 10. In Step S206, the web server 20 instructs the arithmetic server 30 to execute a complicated arithmetic operation(s) corresponding to the received relevant data, and the arithmetic server 30 executes the complicated arithmetic operation(s) at high speed in accordance with the instruction, thereby generating coordinate data indicating coordinates (coordinate values) of drawing points necessary to draw a graph representing the function as a result of the arithmetic operation(s). In the case shown in FIG. 5A, the arithmetic server 30 calculates coordinates of many drawing points representing the "$y=\sqrt{x}$" in the range of $-1 \leq x \leq 5$ at intervals specified in the relevant data. It should be noted that information indicating that no drawing point is present in the range of $-1 \leq x < 0$ is output as a result about the range. The coordinates calculated in Step S206 are in the display style specified in the relevant data, for example, in a below-described decimal display style in which coordinates are expressed with decimals having a proper effective number of decimal places.

Further, in Step S206, the arithmetic server 30 stores the coordinate data on the coordinate group of the calculated coordinates of the drawing points expressed in the decimal display style in the storage 34 in ascending order or descending order of x coordinates. The interval(s) specified in the relevant data may be determined, for example, on the basis of a pixel width corresponding to the range of x coordinates ($-1 \leq x \leq 5$) of the graph display area 131 of the graph tag 130 on the screen of the display 16, and a numeral obtained by dividing the range of x coordinates by the pixel width may be regarded as the minimum interval. This makes it possible to display the calculated coordinates on the screen of the display 16 as faithful as possible.

In Step S207, the arithmetic server 30 outputs the coordinate data on the coordinate group of the drawing points to the web server 20, and the web server 20 generates drawing data in the display style, which is included in the relevant data, for the electronic apparatus 10 to display an image of a graph with the drawing points, and sends, to the electronic apparatus 10, the drawing data for the electronic apparatus 10 to display the image.

In Step S208, the CPU 11 of the electronic apparatus 10 receives the drawing data from the web server 20, and stores the drawing data in the storage 14. The drawing data includes the values (coordinates) of the coordinate group of the drawing points in the display style included in the relevant data, ID data, and the mathematical expression.

In Step S209, the CPU 11 of the electronic apparatus 10 extracts the coordinates of the drawing points in the display style, which is included in the relevant data, from the drawing data read from the storage 14. In Step S210, the CPU 11 of the electronic apparatus 10 plots, in the graph display area 131 of the graph tag 130, the drawing points at the coordinates in the display style, which is included in the relevant data, on the basis of the drawing data, which includes the coordinates of the drawing points generated by the web server 20, and draws a graph 136 by connecting the drawing points with a line. The graph tag 130 may be created in the screen 101 in response to a user operation not before Step S201 but after Step S208. In this case, the string 120, which associates the mathematical expression tag 110 and the graph tag 130 with one another, may be displayed in the screen 101 when the graph tag 130 is displayed.

The graph drawing process then ends. Referring back to FIG. 2, after the graph drawing process, the figure-related process proceeds to Step S103.

The above graph drawing is performed, for example, each time a new mathematical expression is added. In one graph tag 130, two or more graphs may be drawn. Alternatively, two or more graph tags may be created so that, in each graph tag, one graph corresponding to one mathematical expression is drawn. Further, the range of x coordinates and the range of y coordinates of the graph display area 131 may be appropriately changed in response to user operations or the like. When these ranges are changed, actions, if not the same, similar to those in Step S204 to Step S210 of the graph drawing process are performed. That is, the electronic apparatus 10 sends the mathematical expression, the changed coordinate area, and so forth to the arithmetic server 30, the arithmetic server 30 generates coordinate data on a coordinate group of new drawing points, and the electronic apparatus 10 redraws the graph on the basis of the coordinate group included in drawing data for displaying an image of the graph, the drawing data being generated on the basis of the coordinate data.

In Step S103, the CPU 11 of the electronic apparatus 10 determines whether or not a tracing operation has been performed. The system 1 of the embodiment has a function (in terms of functionality) to, while a graph drawn in the graph display area 131 is being traced with a graphic cursor, display coordinates of points thereon. For example, as shown in FIG. 5A, when a graphic cursor 141 is placed on a point on the graph 136, a first marker 151 representing the point is displayed, and first coordinates 152 showing coordinates of the point are displayed. When the graphic cursor 141 is moved as indicated by an arrow 211, so that a graphic cursor 142 is placed on another point on the graph 136, a second marker 155 representing the point is displayed, and second coordinates 156 showing coordinates of the point are displayed. In FIG. 5A, for convenience's sake, the group of the graphic cursor 141, the first marker 151, and the first coordinates 152, and the group of the graphic cursor 142, the second marker 155, and the second coordinates 156 are both displayed. However, in practice, as a graphic cursor is moved, those (i.e., group in the above) previous in terms of time are deleted, and a marker and coordinates are displayed for the current position of the graphic cursor.

Further, the system 1 of the embodiment is configured to choose between the abovementioned decimal display style and a mathematical expression display style as the display style of coordinates. The decimal display style is a style in which if coordinates are values including decimals, the coordinates are expressed with the decimals, like the second coordinates 156, "(2, 1.414)", shown in FIG. 5A. The decimal display style is referred to as "Decimal style". The mathematical expression display style is a style in which if coordinates are values including decimals, but expressible with mathematical expressions, mathematical symbols, and/ or the like, the coordinates are expressed with the mathematical expressions, the mathematical symbols, and/or the like, like fourth coordinates 166, "(2, √2)", on a screen (window) 102 shown in FIG. 5B. The mathematical expression display style is a style to display mathematically correct values, so that the values may contain mathematical symbols or the like other than numerals. The mathematical symbols or the like include a square root, a trigonometric function, a fraction, pi (π), Napier's constant (e), and log. The mathematical expression display style is referred to as "Standard style".

In the arithmetic server 30, the number of decimal places to which coordinates in the decimal display style are calculated is set as the maximum value of the number of decimal places to which coordinates in the decimal display styles are calculated. If the display style in the electronic apparatus 10 is the decimal display style, the arithmetic server 30 calculates, on the basis of the received relevant data, coordinates of drawing points to the maximum value set as the number of decimal places to which coordinates in the decimal display style are calculated (e.g., three dismal places) as needed, but does not calculate the coordinates to decimal places the number of which is more than the maximum value set as the number of decimal places to which coordinates in the decimal display style are calculated (e.g., four decimal places or more). Hence, calculation of the coordinates by the arithmetic server 30 does not take much time. Because the arithmetic server 30 can generate coordinate data in the decimal display style promptly, the electronic apparatus 10 can receive drawing data based on the coordinate data promptly, and display a graph on the display 16 promptly. On the other hand, the arithmetic server 30 may generate the coordinate data by calculating the coordinates to the lowest decimal place (e.g., the fourth decimal place) of the maximum value of the number of decimal places to which coordinates in the decimal display style are calculated (four decimal places), and thereafter rounding off the coordinates from the lowest decimal place (i.e., to the second lowest decimal place; e.g., the third decimal place).

Hence, a value as the number of decimal places to which coordinates of drawing points in the decimal display style are displayable in the electronic apparatus 10 is equal to or smaller than the maximum value set as the number of decimal places to which coordinates of drawing points in the decimal display style are calculated in the arithmetic server 30.

On the other hand, if the display style in the electronic apparatus 10 is the mathematical expression display style, the arithmetic server 30 calculates coordinates of drawing points on the basis of the received relevant data until the arithmetic server 30 can determine whether or not the coordinates are expressible in the mathematical expression display style. The maximum value set as the number of decimal places to which coordinates in the mathematical expression display style are calculated is larger than the maximum value set as the number of decimal places to which coordinates in the decimal display style are calculated. Thus, the arithmetic server 30 executes more complicated arithmetic operations in the case where the mathematical expression display style is set than in the case where the decimal display style is set. Hence, the arithmetic server 30 takes more time to calculate coordinates in the case where the decimal display style is set than in the case where the decimal display style is set. Because the arithmetic server 30 generates coordinate data in the mathematical expression display style somewhat slower than that in the decimal display style, time from when the electronic apparatus 10 sends relevant data to when the electronic apparatus 10 receives drawing data and displays a graph on the display 16 is longer in the case where the mathematical expression display style is set than in the case where the decimal display style is set.

In Step S103, the CPU 11 of the electronic apparatus 10 determines that a tracing operation has been performed when detecting an operation to place a graphic cursor on a graph. When the CPU 11 of the electronic apparatus 10 determines that no tracing operation has been performed, the figure-related process proceeds to Step S105. On the other hand, when the CPU 11 of the electronic apparatus 10 determines that a tracing operation has been performed, the figure-related process proceeds to Step S104. In Step S104, the CPU 11 of the electronic apparatus 10 performs a tracing process. Hereinafter, the tracing process will be described with reference to FIG. 4A and FIG. 4B. FIG. 4A and FIG. 4B show its flowcharts.

In Step S301, the CPU 11 of the electronic apparatus 10 starts obtaining information on a point specified with a graphic cursor. Thereafter, the CPU 11 of the electronic apparatus 10 repeatedly and regularly obtains information on a point specified with the graphic cursor, for example, at predetermined intervals, and acts according to the obtained specified point.

In Step S302, the CPU 11 of the electronic apparatus 10 determines whether the current display style is the decimal display style or the mathematical expression display style. When the CPU 11 of the electronic apparatus 10 determines that the current display style is the mathematical expression display style, the tracing process proceeds to Step S308. On the other hand, when the CPU 11 of the electronic apparatus 10 determines that the current display style is the decimal display style, the tracing process proceeds to Step S303.

In Step S303, the CPU 11 of the electronic apparatus 10 extracts/selects, from the drawing data/drawing points stored in the storage 14 in Step S208, a drawing point closest to the currently specified point obtained in Step S301, and reads coordinates of the selected drawing point from the storage 14. In Step S304, the CPU 11 of the electronic apparatus 10 displays the read coordinates of the drawing point as coordinates of the specified point in the graph display area 131. No arithmetic operations to calculate coordinates of the specified point are executed by the arithmetic server 30 through Step S303 to Step S304.

In Step S305, the CPU 11 of the electronic apparatus 10 determines whether or not the display style has been changed to the mathematical expression display style. The display style may be changed, for example, by the user selecting an item "display style" from a menu displayed by the user clicking the right mouse button. When the CPU 11 of the electronic apparatus 10 determines that the display style has been changed to the mathematical expression display style, the tracing process proceeds to Step S308. On the other hand, when the CPU 11 of the electronic apparatus 10 determines that the display style has not been changed to the mathematical expression display style, the tracing process proceeds to Step S306.

In Step S306, the CPU 11 of the electronic apparatus 10 determines whether or not to end the tracing process. For example, if the currently specified point is a predetermined distance or more away from the currently selected graph, the CPU 11 of the electronic apparatus 10 determines to end the tracing process. When the CPU 11 of the electronic apparatus 10 determines to end the tracing process, the tracing process ends, and returns to the figure-related process described with reference to FIG. 2. On the other hand, when the CPU 11 of the electronic apparatus 10 determines not to end the tracing process, the tracing process proceeds to Step S307.

In Step S307, the CPU 11 of the electronic apparatus 10 determines whether or not the specified point has changed (moved). When the CPU 11 of the electronic apparatus 10 determines that the specified point had not changed, the tracing process returns to Step S305. That is, the CPU 11 of the electronic apparatus 10 repeats determining whether or not the display style has been changed to the mathematical expression display style, and determining whether or not to end the tracing process. In Step S307, when the CPU 11 of the electronic apparatus 10 determines that the specified point has changed, the tracing process returns to Step S303. That is, the CPU 11 of the electronic apparatus 10 selects a drawing point closest to the currently specified point, and displays coordinates of the selected drawing point in the decimal display style. Thus, while the display style is the decimal display style, and specified points are on a graph, coordinates of the specified points, which are specified with a graphic cursor, are, as shown in FIG. 5A, successively displayed in the decimal display style.

When determining in Step S302 that the display style is the mathematical expression display style, or when determining in Step S305 that the display style has been changed to the mathematical expression style, the CPU 11 of the electronic apparatus 10 acts as follows. In Step S308, the CPU 11 of the electronic apparatus 10 selects, from the drawing points stored in Step S208, a drawing point closest to the specified point, and reads the mathematical expression for the graph and coordinates of the selected drawing point. In Step S309, the CPU 11 of the electronic apparatus 10 sends, to the web server 20, relevant data which includes the read mathematical expression, the read coordinates, and information indicating that the display style is the mathematical expression display style.

In Step S310, the web server 20 receives the relevant data sent from the electronic apparatus 10. In Step S311, the web server 20 instructs the arithmetic server 30 to execute an arithmetic operation(s) corresponding to the received relevant data, and the arithmetic server 30 generates coordinate data indicating the coordinates of the selected drawing point in the mathematical expression display style in accordance with the instruction. More specifically, in Step S311, the arithmetic server 30 determines, on the basis of the coordinate(s) (e.g., x coordinate) of the received selected drawing point, where the received selected drawing point is in the ascending order or descending order of (e.g., x) coordinates, determines coordinates (x coordinate and y coordinate) of the selected drawing point in the mathematical expression display style on the basis of the determined rank of the selected drawing point, and generates coordinate data indicating the coordinates in the mathematical expression display style.

In Step S312, the web server 20 obtains the generated coordinate data, from the arithmetic server 30, and generates, on the basis of the coordinate data, drawing data for the electronic apparatus 10 to display an image showing the coordinates in the mathematical expression display style. Further, in Step S312, the web server 20 sends, to the electronic apparatus 10, the drawing data. The web server 20 may send data of an address of the drawing data instead of the drawing data. In this case, the electronic apparatus 10 accesses a site that causes the display 16 of the electronic apparatus 10 to display an image based on the drawing data stored in the web server 20.

In Step S313, the CPU 11 of the electronic apparatus 10 receives the drawing data. In Step S314, the CPU 11 of the electronic apparatus 10 displays, in the graph display area 131, coordinates of the specified point in the mathematical expression display style by using the received drawing data.

In Step S315, the CPU 11 of the electronic apparatus 10 determines whether or not the display style has been changed to the decimal display style. When the CPU 11 of the electronic apparatus 10 determines that the display style has been changed to the decimal display style, the tracing process returns to Step S303. That is, the CPU 11 of the electronic apparatus 10 displays the coordinates of the specified point in the decimal display style. On the other hand, when the CPU 11 of the electronic apparatus 10 determines that the display style has not been changed to the decimal display style, the tracing process proceeds to Step S316.

In Step S316, the CPU 11 of the electronic apparatus 10 determines whether or not to end the tracing process. When the CPU 11 of the electronic apparatus 10 determines to end the tracing process, the tracing process ends, and returns to the figure-related process described with reference to FIG. 2. On the other hand, when the CPU 11 of the electronic apparatus 10 determines not to end the tracing process, the tracing process proceeds to Step S317.

In Step S317, the CPU 11 of the electronic apparatus 10 determines whether or not the specified point has changed (moved). When the CPU 11 of the electronic apparatus 10 determines that the specified point has not changed, the tracing process returns to Step S315. That is, the CPU 11 of the electronic apparatus 10 repeats determining whether or not the display style has been changed to the decimal display style, and determining whether or not to end the tracing process. On the other hand, when the CPU 11 of the electronic apparatus 10 determines that the specified point has changed, the tracing process proceeds to Step S318.

In Step S318, the CPU 11 of the electronic apparatus 10 determines whether or not the specified point has stopped changing (moving). When determining that the specified point has not stopped changing, the CPU 11 of the electronic apparatus 10 waits until the specified point stops changing. On the other hand, when the CPU 11 of the electronic apparatus 10 determines that the specified point has stopped changing, thereby determining that the specified point has settled, the tracing process returns to Step S308. That is, after the specified point stops changing, the CPU 11 of the electronic apparatus 10 selects, as the selected drawing point, a drawing point closest to the specified point. The CPU 11 of the electronic apparatus 10 sends, as a request, information on the selected drawing point to the web server 20, and receives, as a response, drawing data which includes coordinate data indicating coordinates of the selected drawing point in the mathematical expression display style. The CPU 11 of the electronic apparatus 10 displays the coordinates of the selected drawing point on the basis of the received drawing data. For displaying coordinates in the mathematical expression display style, the electronic apparatus 10 and the web server 20 communicate with one another. Hence, it is inefficient to keep obtaining coordinates of selected drawing points in the mathematical expression display style while the specified point is changing (moving) (i.e., while points on a graph are continuously and successively specified with a graphic cursor). Therefore, after the specified point stops changing, the CPU 11 of the electronic apparatus 10 obtains and displays coordinates of the selected drawing point, which is closest to the specified point, in the mathematical expression display style as coordinates of the specified point. If a communication resource has room, it may be as well to keep obtaining coordinates of selected drawing points in the mathematical expression display style while the specified point is changing.

In the case where the display style is the mathematical expression display style, by the above actions, for example, as shown in FIG. 5B, when a graphic cursor 143 is placed on a point on the graph 136, a third marker 161 representing the point is displayed, and third coordinates 166 showing coordinates of the point are displayed in the mathematical expression display style. When the graphic cursor 143 is moved as indicated by an arrow 212, so that a graphic cursor 144 is placed on another point on the graph 136, a forth marker 165 representing the point is displayed, and fourth coordinates 166 showing coordinates of the point are displayed in the mathematical expression display style. In FIG. 5B, for convenience' sake, the group of the graphic cursor 143, the third marker 161, and the third coordinates 162, and the group of the graphic cursor 144, the fourth marker 165, and the fourth coordinates 166 are both displayed. However, in practice, as a graphic cursor is moved, those (i.e., group in the above) previous in terms of time are deleted, and a marker and coordinates are displayed for the current position of the graphic cursor.

Referring back to FIG. 2, in Step S105, the CPU 11 of the electronic apparatus 10 determines whether or not to end the figure-related process. When the CPU 11 of the electronic apparatus 10 determines not to end the figure-related process, the figure-related process returns to Step S101. That is, the figure-related process is repeated. On the other hand, when the CPU 11 of the electronic apparatus 10 determines to end the figure-related process, the figure-related process ends.

According to the embodiment, the tracing process for, when a point on the graph 136 drawn in the graph display area 131 is specified, displaying coordinates of the point is performed. In this tracing process, two types of display styles, the decimal display style and the mathematical expression display style, are selectable. The decimal display style uses coordinates of drawing points used in drawing the graph 136, and hence can realize quick tracing or coordinate drawing following a moving graphic cursor. On the other hand, the mathematical expression display style requires complicated arithmetic operations, and hence results in lower following performance in following a moving graphic cursor in tracing or coordinate drawing, but can display not approximate values but mathematically correct coordinates.

In the system 1 of the embodiment, relatively complicated arithmetic operations are executed by the arithmetic server 30 locating behind the web server 20. The system 1 thus configured enables complicated arithmetic operations with the arithmetic server 30 which has high processing performance. Because the electronic apparatus 10 does not need to execute complicated operations or actions, a load of processing performed by the electronic apparatus 10 is reduced.

The information sent from the electronic apparatus 10 is relevant data which includes, for example, a function(s), and the information received by the electronic apparatus 10 is drawing data which includes, for example, image data showing coordinates of drawing points in the specified display style generated by the web server 20. Thus, processing performed by the arithmetic server 30 is concealed.

In the above embodiment, a point to display coordinates is specified by the user with a graphic cursor. However, the method for specifying such a point is not limited thereto. For example, if a touchscreen is provided on the display 16 where graphs are displayed, the point may be specified by the user touching a desired point on the touchscreen. As another example, the point may be specified by the user inputting an x coordinate of the point with a keyboard. Further, for example, coordinates of an intersection point of graphs may be displayed. In such a case, an intersection point may be specified by the user inputting functions for graphs which intersect.

In the above embodiment, the data sent from the web server 20 to the electronic apparatus 10 to display coordinates in the mathematical expression display style is an image showing the coordinates. However, this is not intended to limit the present invention. The format of the data is no object as far as the electronic apparatus 10 can display coordinates in the mathematical expression display style. For example, if mathematical expression data is the data sent from the web server 20 to the electronic apparatus 10 as data necessary to display coordinates in the mathematical expression display style, the format of the mathematical expression data is no object as far as the electronic apparatus 10 can display coordinates in the mathematical expression display style on the basis of the mathematical expression data.

Further, in the above embodiment or one or more other embodiments, when the display style is the decimal display style, the CPU 11 of the electronic apparatus 10 may display a figure(s) by executing an arithmetic operation(s) for the decimal display style by itself without requesting the arithmetic server 30 to execute the arithmetic operation(s) for the decimal display style, whereas when the display style is the mathematical expression display style, the CPU 11 of the electronic apparatus 10 may display a figure(s) by requesting the arithmetic server 30 to execute an arithmetic operation(s) for the mathematical expression display style without executing the arithmetic operation(s) for the mathematical expression display style by itself.

Further, in the above embodiment, in Step S206, the arithmetic server 30 calculates coordinates of all the drawing points in the mathematical expression display style if the display style included in the relevant data is the mathematical expression display style. However, time required for calculating coordinates in the mathematical expression display style is usually longer than time required for calculating coordinates in the decimal display style. Hence, to promptly draw a graph, actions may be performed as follows: the arithmetic server 30 first calculates coordinates (i.e., generates coordinate data) in the decimal display style, and sends the same (drawing data including the coordinate data) to the electronic apparatus 10 via the web server 20; the CPU 11 of the electronic apparatus 10 first draws a graph on the basis of the coordinate data in the decimal display style; the arithmetic server 30 generates coordinate data in the mathematical expression display style while or after generating the coordinate data in the decimal display style; the web server 20 sends drawing data generated on the basis of the coordinate data in the mathematical expression display style to the electronic apparatus 10 after sending the drawing data in the decimal display style to the electronic apparatus 10; and the CPU 11 of the electronic apparatus 10 replaces the displayed image (graph) based on the coordinate data in the decimal display style by an image (graph) based on the coordinate data in the mathematical expression display style.

Alternatively, the arithmetic server 30 first calculates coordinates in the decimal display style, thereby generating coordinate data in the decimal display style; in Step S207, the web server 20 sends drawing data generated on the basis of the coordinate data in the decimal display style to the electronic apparatus 10; the arithmetic server 30 also generates coordinate data in the mathematical expression display style after generating the coordinate data in the decimal display style, and stores the same in the storage 34. Then, in the tracing process, when the web server 20 receives relevant data from the electronic apparatus 10 in Step S310, the arithmetic server 30 reads, from the storage 34, coordinate data in the mathematical expression display style having ID data which agrees with ID data of the relevant data; the web server 20 generates drawing data on the basis of the read coordinate data in the mathematical expression display style, and sends the generated drawing data to the electronic apparatus 10. This eliminates time for arithmetic processing performed by the arithmetic server 30 in the tracing process, and hence can reduce response time to user's operations.

The programs which run on the electronic apparatus 10 may be described with JavaScript®. The electronic apparatus 10 and the web server 20 may send and receive information with one another via HTTP protocol. The information to be sent/received therebetween may be REST JSON data, and may be sent/received via HTTP POST/GET.

In the above embodiment, applications for mathematics education are cited as examples. However, this is not intended to limit the present invention. The above technology is applicable to applications for various types of education. Further, the technology is applicable to various applications not only for education but also, for example, for analysis, in particular, applications in the fields of mathematics, physics, chemistry, other science, and engineering.

The present invention is not limited to the above embodiment(s), and can be variously modified in the practical phase without departing from the scope of the present invention. Further, the embodiments may be appropriately combined and implemented. In this case, combined effects are obtained. Still further, the embodiments include various inventions which can be extracted by, from disclosed elements, selecting some of the disclosed elements and combining the same. For example, even if some elements are removed from all the elements disclosed in the embodiment(s), a configuration made by removing the elements can be extracted as an invention as far as it can achieve at least one object and obtain at least one effect.

What is claimed is:

1. An electronic apparatus comprising:
a memory;
a display; and
a processor which:
sends first relevant data including a mathematical expression to at least one server;
receives, from the at least one server, first drawing data including coordinates of drawing points in a first display style to display a graph corresponding to the mathematical expression, the first drawing data being generated by the at least one server based on the first relevant data;
stores at least part of the received first drawing data in the memory, and displays, on the display, the graph based on the first drawing data;
determines whether a display style when a point is specified in the graph after the graph is displayed is a second display style that takes more time for an arithmetic operation than the first display style; and
when it is determined that the display style is the second display style, waits while the specified point keeps moving, and when the specified point stops moving and settles, (i) sends, to the at least one server, second relevant data including coordinates of the point and information indicating that the display style is the second display style, (ii) receives second-display-style coordinate data which is (a) second drawing data including the coordinates of the point in the second display style generated by the at least one server based on the second relevant data or (b) data including an address of the second drawing data, and (iii) displays, on the display, the coordinates of the point in the second display style based on the second-display-style coordinate data;
wherein the first display style is a style in which if a coordinate is a value including a decimal, the coordinate is displayed with the decimal, and
wherein the second display style is a style in which if a coordinate is a value including a decimal, but is expressible by a mathematical expression and/or a mathematical symbol, the coordinate is displayed using the mathematical expression and/or the mathematical symbol.

2. The electronic apparatus according to claim 1, wherein the processor displays the graph based on the first drawing data generated according to the first display style.

3. The electronic apparatus according to claim 1, wherein a maximum number of decimal places up to which the coordinates of the point in the first display style are displayable is equal to or smaller than a maximum number of decimal places up to which the coordinates of the point in the first display style are calculated by the at least one server.

4. The electronic apparatus according to claim 1, wherein when the display style of the coordinates in the graph is changed from the second display style to the first display style, the processor displays the coordinates in the graph by using information on the coordinates in the first display style stored in the memory.

5. The electronic apparatus according to claim 1, wherein when it is determined that the display style of the coordinates in the graph has been changed from the first display style to the second display style, the processor (i) sends, to the at least one server, the second relevant data, (ii) receives the second-display-style coordinate data which is (a) the second drawing data including the coordinates of the point in the second display style generated by the at least one server based on the second relevant data or (b) the data including the address of the second drawing data, and (iii) displays, on the display, the coordinates of the point in the second display style based on the second-display-style coordinate data.

6. The electronic apparatus according to claim 1, wherein the processor determines whether the display style is the first display style when the point is specified in the graph after the graph is displayed, and
when it is determined that the display style is the first display style, the processor: obtains, each time a position of the specified point changes, the coordinates of the point in the first display style, based on the changing position and the at least part of the first drawing data stored in the memory, without requesting the at least one server to calculate the coordinates of the point in the first display style, and displays the obtained coordinates in the first display style on the display.

7. The electronic apparatus according to claim 1, wherein a maximum number of decimal places up to which the coordinates in the second display style are calculated is larger than a maximum number of decimal places up to which the coordinates in the first display style are calculated.

8. An information processing method of an electronic apparatus, comprising:

sending first relevant data including a mathematical expression to at least one server;

receiving, from the at least one server, first drawing data including coordinates of drawing points in a first display style to display a graph corresponding to the mathematical expression, the first drawing data being generated by the at least one server based on the first relevant data;

storing at least part of the received first drawing data in a memory of the electronic apparatus, and displaying, on a display of the electronic apparatus, the graph based on the first drawing data;

determining whether a display style when a point is specified in the graph after the graph is displayed is a second display style that takes more time for an arithmetic operation than the first display style; and when it is determined that the display style is the second display style, waiting while the specified point keeps moving, and when the specified point stops moving and settles, (i) sending, to the at least one server, second relevant data including coordinates of the point and information indicating that the display style is the second display style, (ii) receiving second-display-style coordinate data which is (a) second drawing data including the coordinates of the point in the second display style generated by the at least one server based on the second relevant data or (b) data including an address of the second drawing data, and (iii) displaying, on the display, the coordinates of the point in the second display style based on the second-display-style coordinate data;

wherein the first display style is a style in which if a coordinate is a value including a decimal, the coordinate is displayed with the decimal, and wherein the second display style is a style in which if a coordinate is a value including a decimal, but is expressible by a mathematical expression and/or a mathematical symbol, the coordinate is displayed using the mathematical expression and/or the mathematical symbol.

9. The information processing method according to claim 8, wherein the displaying of the graph includes displaying the graph based on the first drawing data generated according to the first display style.

10. The information processing method according to claim 8, wherein a maximum number of decimal places up to which the coordinates of the point in the first display style are displayable is equal to or smaller than a maximum number of decimal places up to which the coordinates of the point in the first display style are calculated by the at least one server.

11. The information processing method according to claim 8, further comprising: when the display style of the coordinates in the graph is changed from the second display style to the first display style, displaying the coordinates in the graph by using information on the coordinates in the first display style stored in the memory.

12. The information processing method according to claim 8, further comprising:

when it is determined that the display style of the coordinates in the graph has been changed from the first display style to the second display style, (i) sending, to the at least one server, the second relevant data, (ii) receiving the second-display-style coordinate data which is (a) the second drawing data including the coordinates of the point in the second display style generated by the at least one server based on the second relevant data or (b) the data including the address of the second drawing data, and (iii) displaying, on the display, the coordinates of the point in the second display style based on the second-display-style coordinate data.

13. The information processing method according to claim 8, further comprising:

determining whether the display style is the first display style when the point is specified in the graph after the graph is displayed; and when it is determined that the display style is the first display style:

obtaining, each time a position of the specified point changes, the coordinates of the point in the first display style, based on the changing position and the at least part of the first drawing data stored in the memory, without requesting the at least one server to calculate the coordinates of the point in the first display style; and displaying the obtained coordinates in the first display style on the display.

14. A system comprising:

at least one server; and an electronic apparatus including:

a memory;

a display; and a processor which:

sends first relevant data including a mathematical expression to at least one server;

receives, from the at least one server, first drawing data including coordinates of drawing points in a first display style to display a graph corresponding to the mathematical expression, the first drawing data being generated by the at least one server based on the first relevant data;

stores at least part of the received first drawing data in the memory, and displays, on the display, the graph based on the first drawing data;

determines whether a display style when a point is specified in the graph after the graph is displayed is a first second display style that takes more time for an arithmetic operation than the first display style; and when it is determined that the display style is the second display style, waits while the specified point keeps moving, and when the specified point stops moving and settles, (i) sends, to the at least one server, second relevant data including coordinates of the point and information indicating that the display style is the second display style, (ii) receives second-display-style coordinate data which is (a) second drawing data including the coordinates of the point in the second display style generated by the at least one server based on the second relevant data or (b) data including an address of the second drawing data, and (iii) displays, on the display, the coordinates of the point in the second display style based on the second-display-style coordinate data;

wherein the first display style is a style in which if a coordinate is a value including a decimal, the coordinate is displayed with the decimal, and wherein the second display style is a style in which if a coordinate is a value including a decimal, but is expressible by a mathematical expression and/or a mathematical symbol, the coordinate is displayed using the mathematical expression and/or the mathematical symbol.

15. A non-transitory computer-readable recording medium storing a program, wherein the program, when executed by a computer of an electronic apparatus, causes the computer to:

send first relevant data including a mathematical expression to at least one server;

receive, from the at least one server, first drawing data including coordinates of drawing points in a first display style to display a graph corresponding to the mathematical expression, the first drawing data being generated by the at least one server based on the first relevant data;

store at least part of the received first drawing data in a memory of the electronic apparatus, and display, on a display of the electronic apparatus, the graph based on the first drawing data;

determine whether a display style when a point is specified in the graph after the graph is displayed is a first second display style that takes more time for an arithmetic operation than the first display style; and when it is determined that the display style is the second display style, wait while the specified point keeps moving, and when the specified point stops moving and settles, (i) send, to the at least one server, second relevant data including coordinates of the point and information indicating that the display style is the second display style, (ii) receive second-display-style coordinate data which is (a) second drawing data including the coordinates of the point in the second display style generated by the at least one server based on the second relevant data or (b) data including an address of the second drawing data, and (iii) display, on the display, the coordinates of the point in the second display style based on the second-display-style coordinate data;

wherein the first display style is a style in which if a coordinate is a value including a decimal, the coordinate is displayed with the decimal, and wherein the second display style is a style in which if a coordinate is a value including a decimal, but is expressible by a mathematical expression and/or a mathematical symbol, the coordinate is displayed using the mathematical expression and/or the mathematical symbol.

* * * * *

UNITED STATES PATENT AND TRADEMARK OFFICE
CERTIFICATE OF CORRECTION

PATENT NO. : 10,885,685 B2
APPLICATION NO. : 16/383320
DATED : January 5, 2021
INVENTOR(S) : Hirokazu Tanaka Page 1 of 1

It is certified that error appears in the above-identified patent and that said Letters Patent is hereby corrected as shown below:

In the Claims

Column 16, Line 53 (Claim 14, Line 20), delete "first".

Column 18, Line 2 (Claim 15, Line 18), delete "first".

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*